April 8, 1924.

W. B. GAMMONS 1,490,069

FLUTED TOOL

Filed May 2, 1921

INVENTOR.
William B Gammons.
BY
Hart.
His ATTORNEY.

Patented Apr. 8, 1924.

1,490,069

UNITED STATES PATENT OFFICE.

WILLIAM B. GAMMONS, OF MANCHESTER, CONNECTICUT, ASSIGNOR TO THE GAMMONS-HOLMAN COMPANY, OF MANCHESTER, CONNECTICUT, A CORPORATION OF CONNECTICUT.

FLUTED TOOL.

Application filed May 2, 1921. Serial No. 466,311.

*To all whom it may concern:*

Be it known that I, WILLIAM B. GAMMONS, a citizen of the United States, and a resident of Manchester, county of Hartford, State of Connecticut, have invented certain new and useful Improvements in a Fluted Tool, of which the following is a specification.

This invention relates to fluted tools, such as reamers or millers, for use in forming, shaping, etc., holes, slots and the like in metal parts, and the aim of the invention is to provide tools of this sort having features of novelty and advantage which result in smoothness and accuracy and in greater speed in operation.

In the accompanying drawing:—

Figure 1:
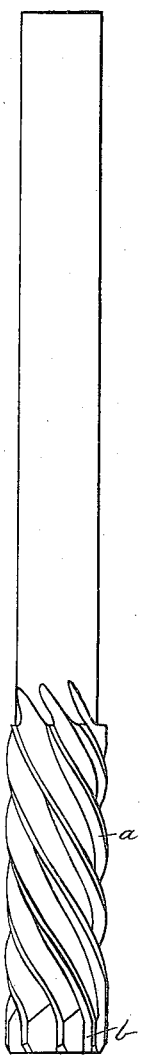
Fig. 1 is a side view of a reamer illustrating the present invention.
Figure 3:
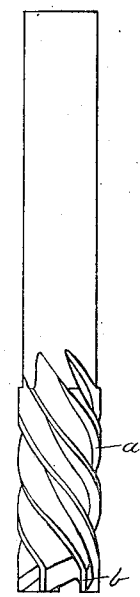
Figs. 3 and 4 are views similar to Figs. 1 and 2 respectively, but illustrating a combined side and end miller.
Figure 4:
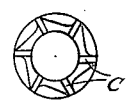
Figure 2:
Fig. 2 is a forward end view thereof.

It will be seen from the drawings that my invention consists of a fluted tool having one or more continuous cutting edges, each of which, in part, is helical and in part non-helical. In the present illustrative disclosures, the cutting edges for the greater part of their lengths are helical, as indicated at $a$, and terminate at their forward ends in straight longitudinally extending portions $b$. The tool shown in Figs. 3 and 4 has at its forward end teeth $c$ as is usual in end millers.

As the tool constructed in accordance with the present invention is fed into the work, the straight portions of the cutting edges perform most of the actual cutting, while the helical portions are effective in truing up the hole formed by the straight edges. Furthermore, the helically fluted portion has a close fitting bearing, so to speak, in the hole formed, and thus the tool is steadied and firmly held against such chattering as the straight portions of the cutting edges may tend to cause. The helical flutes are further of advantage in that they take care of the chips cut out of the metal in which the hole is formed. It will be noted that the cutting edges of the flutes are continuous so that there is no break in the cut taken, and thus a smooth cutting action is obtained. Furthermore, the helically fluted portion has a bearing in the hole formed right up to the straight portions of the cutting edges, thereby effectively reducing the chattering effect, which may be caused by these straight edges, to a minimum. The tools may also be employed as side millers.

It is, of course, obvious that my invention is susceptible of various modifications and changes which are within the spirit of the invention without departing from the scope of the following claims, it being understood that the present disclosures of my invention are by way of illustration only and they are not to be taken as restrictive of my conception.

I claim as my invention:—

1. A reamer of the character described having a plurality of continuous cutting edges helical in part and straight in part, the helical and straight portions of each edge merging into each other without break, and said cutting edges being substantially of uniform diameter, said straight portions of said edges being at the forward end of said reamer.

2. A reamer of the character described having a plurality of continuous helical cutting edges terminating at their forward ends in integral straight longitudinally extending portions, said cutting edges being continuous from end to end and being of substantially uniform diameter.

WILLIAM B. GAMMONS.